(12) United States Patent
Castro et al.

(10) Patent No.: US 10,996,717 B2
(45) Date of Patent: May 4, 2021

(54) SPEAKER ASSEMBLY IN A DISPLAY ASSISTANT DEVICE

(71) Applicant: GOOGLE LLC, Mountain View, CA (US)

(72) Inventors: James Castro, San Jose, CA (US); Carl Cepress, Los Altos, CA (US); Liang Ching Tseng, Taipei (TW); Darren Torrie, Mountain View, CA (US); Frances Kwee, Mountain View, CA (US); Rex Price, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/597,745

(22) Filed: Oct. 9, 2019

(65) Prior Publication Data
US 2020/0112786 A1 Apr. 9, 2020

Related U.S. Application Data (63) Continuation-in-part of application No. 16/596,709, filed on Oct. 8, 2019, and a continuation-in-part of (Continued)

(51) Int. Cl.
*G06F 1/16* (2006.01)
*G10L 15/28* (2013.01)
(Continued)

(52) U.S. Cl.
CPC ........ *G06F 1/166* (2013.01); *G02F 1/133308* (2013.01); *G02F 1/133753* (2013.01);
(Continued)

(58) Field of Classification Search
CPC ...... G06F 1/166; G06F 1/1626; G06F 1/1637; G06F 3/167; G06F 1/1683; G06F 1/1686;
(Continued)

(56) References Cited

U.S. PATENT DOCUMENTS 6,411,271 B1 * 6/2002 Bang ..................... F16M 11/10
248/920
6,437,238 B1 8/2002 Annerino et al.
(Continued)

FOREIGN PATENT DOCUMENTS

CN 107454513 A * 6/2016 ............... H04R 9/06
CN 107454513 * 12/2017 ............... H04R 9/06
(Continued)

OTHER PUBLICATIONS

Burns, Chris, "Google Home Hub Leaked: The new do-all screen", Slashgear, Sep. 18, 2018, https://www.slashgear.com/google-home-hub-release-date-images-smart-screen-18546222/ (Year:2018).
(Continued)

*Primary Examiner* — Oyesola C Ojo
(74) *Attorney, Agent, or Firm* — Colby Nipper (57) ABSTRACT

In a display assistant device, a speaker is mounted in a waveguide structure which is at least partially disposed beneath a display screen. The waveguide structure is mounted in an exterior housing which includes speaker grills distributed on a plurality of surfaces of the exterior housing, permitting sound waves from the speaker to be projected outside the exterior housing. A cover structure is disposed on top of the waveguide structure to conceal the waveguide structure and speaker within the exterior housing. The cover structure has a tilted bottom surface configured to be suspended above the waveguide structure and to be separated by a first space. Sound waves projected from an upper portion of the speaker are reflected by the tilted bottom surface and are guided through the first space to exit the device from a speaker grill portion located on a rear side of the exterior housing.

12 Claims, 9 Drawing Sheets

Related U.S. Application Data application No. 16/596,711, filed on Oct. 8, 2019, and a continuation of application No. PCT/US2018/064536, filed on Dec. 7, 2018.

(60) Provisional application No. 62/743,464, filed on Oct. 9, 2018, provisional application No. 62/742,892, filed on Oct. 8, 2018, provisional application No. 62/742,888, filed on Oct. 8, 2018.

(51) Int. Cl.

| | |
|---|---|
| *H04R 1/02* | (2006.01) |
| *H04R 1/34* | (2006.01) |
| *H04L 12/28* | (2006.01) |
| *G02F 1/1333* | (2006.01) |
| *G02F 1/1337* | (2006.01) |
| *G06F 3/16* | (2006.01) |
| *G06F 21/83* | (2013.01) |

(52) U.S. Cl.
CPC .......... *G06F 1/1605* (2013.01); *G06F 1/1626* (2013.01); *G06F 1/1637* (2013.01); *G06F 1/1658* (2013.01); *G06F 1/1683* (2013.01); *G06F 1/1686* (2013.01); *G06F 1/1688* (2013.01); *G06F 1/1698* (2013.01); *G06F 3/167* (2013.01); *G06F 21/83* (2013.01); *G10L 15/28* (2013.01); *H04R 1/023* (2013.01); *H04R 1/025* (2013.01); *H04R 1/028* (2013.01); *H04R 1/345* (2013.01); *G02F 1/133325* (2021.01); *G02F 1/133761* (2021.01); *H04L 12/282* (2013.01); *H04R 2499/15* (2013.01)

(58) Field of Classification Search
CPC ...... G06F 1/1688; G06F 1/1698; G06F 21/83; G06F 1/16; G06F 21/6245; G06F 1/1658; G06F 1/1671; G06F 1/203; G06F 2200/1631; G06F 1/1656; G06F 1/1605; H04R 1/023; H04R 1/028; H04R 1/345; H04R 1/025; H04R 2499/15; H04R 1/02; H04R 27/00; H04R 2227/003; H04R 2227/005; H04R 1/026; H04R 1/34; H04R 1/021; G02F 1/133308; G02F 1/133753; G02F 2001/133325; G02F 2001/133761; G10L 15/28; H04L 12/282; H04N 7/14; H04N 21/4223; H04N 21/43615

See application file for complete search history.

(56) References Cited

U.S. PATENT DOCUMENTS

| | | | | |
|---|---|---|---|---|
| 8,528,690 | B1* | 9/2013 | Wu | H04R 1/345 |
| | | | | 181/179 |
| 9,064,386 | B2* | 6/2015 | Won | G08B 3/00 |
| 9,641,920 | B1 | 5/2017 | Jones, II | |
| D789,362 | S | 6/2017 | Elijas | |
| D873,815 | S | 1/2020 | McWilliam et al. | |
| 2008/0165485 | A1* | 7/2008 | Zadesky | H05K 5/0217 |
| | | | | 361/679.02 |
| 2010/0146766 | A1 | 6/2010 | Dabov et al. | |
| 2010/0205667 | A1 | 8/2010 | Anderson | |
| 2010/0272307 | A1 | 10/2010 | Okumura | |
| 2013/0082984 | A1 | 4/2013 | Drzaic et al. | |
| 2013/0098854 | A1 | 4/2013 | Lee et al. | |
| 2013/0282499 | A1 | 10/2013 | Kato | |
| 2014/0268578 | A1 | 9/2014 | Dolci et al. | |
| 2014/0376758 | A1* | 12/2014 | Barcel | H04R 1/023 |
| | | | | 381/334 |
| 2015/0049894 | A1 | 2/2015 | Ditullo et al. | |
| 2015/0053497 | A1* | 2/2015 | Horiuchi | H04N 5/642 |
| | | | | 181/199 |
| 2015/0185768 | A1 | 7/2015 | Voege et al. | |
| 2015/0195635 | A1 | 7/2015 | Garfio et al. | |
| 2015/0278499 | A1 | 10/2015 | Levitov | |
| 2015/0373440 | A1 | 12/2015 | Fontana | |
| 2017/0006715 | A1* | 1/2017 | Choi | G06F 1/1626 |
| 2017/0258191 | A1 | 9/2017 | Poon et al. | |
| 2017/0278361 | A1 | 9/2017 | Fujimoto | |
| 2018/0174584 | A1 | 6/2018 | Chih et al. | |
| 2018/0190285 | A1 | 7/2018 | Heckman et al. | |
| 2018/0199123 | A1 | 7/2018 | Rao et al. | |
| 2019/0212274 | A1 | 7/2019 | Patterson et al. | |
| 2019/0212774 | A1 | 7/2019 | Patterson et al. | |
| 2020/0090662 | A1 | 3/2020 | Castro et al. | |
| 2020/0110441 | A1 | 4/2020 | Castro et al. | |
| 2021/0011518 | A1 | 1/2021 | Zin et al. | |

FOREIGN PATENT DOCUMENTS

| | | | | | |
|---|---|---|---|---|---|
| CN | | 107454513 | A * | 12/2017 | ............... H04R 9/06 |
| EP | | 0303912 | | 2/1989 | |
| EP | | 3122022 | A2 | 1/2017 | |
| JP | | 2007259262 | | 4/2007 | |
| JP | | 2008211381 | A * | 9/2008 | ............... H04R 1/02 |
| JP | | 2009038446 | A | 2/2009 | |
| JP | | 2014131243 | A * | 7/2014 | |
| JP | | 2014131243 | A | 7/2014 | |
| JP | | 2018121168 | A | 8/2018 | |
| TW | | 201131335 | A | 9/2011 | |
| WO | | 2016198559 | | 12/2016 | |
| WO | WO | 2018/139462 | A1 | 8/2018 | |
| WO | | WO-2018139462 | A1 * | 8/2018 | ............... H04R 1/28 |

OTHER PUBLICATIONS

Awad, Ballaith, "Exclusive Google Home Hub to be Launched on Oct. 9; A Smart with 7-inch Display", Mysmartprice, Sep. 18, 2018, https://web.archive.org/web/20180918191325/https://mysmartprice.com/gear/google-home-hub/ (Year:2018).

I-Home Technology Co. et al., "Lynky: Touchscreen Smart Hub with Google Assistant", Feb. 24, 2018, 13 pgs.

Google, International Search Report/Written Opinion, PCT/US2018/064452, dated Jun. 24, 2019, 12 pgs.

Google, International Search Report/Written Opinion, PCT/US2018/064536, dated Jun. 28, 2019, 12 pgs.

Google, International Search Report/Written Opinion, PCT/US2018/064449, dated Aug. 28, 2019, 21 pgs.

"Archos Hello Activates Al, Displays and Manages Anything, Anywhere at home, just by Asking", http://www.archos.com/corporate/press/press_releases/EN_20180828_ARCHOS_IFA_Next_2018_ARCHOS_Hello.pdf, Aug. 28, 2018, 6 pages.

"Final Office Action", U.S. Appl. No. 16/596,711, dated Feb. 25, 2021, 19 pages.

"International Search Report and Written Opinion", Application No. PCT/US2019/028959, dated Jul. 24, 2019, 15 pages.

"International Search Report and Written Opinion", Application No. PCT/US2019/028601, dated Dec. 20, 2019, 18 pages.

"Non-Final Office Action", U.S. Appl. No. 16/596,711, dated Oct. 14, 2020, 17 pages.

"Non-Final Office Action", U.S. Appl. No. 16/597,745, dated Nov. 25, 2020, 9 pages.

"Pre-Interview First Office Action", U.S. Appl. No. 16/525,360, dated Jul. 2, 2020, 3 pages.

"We took apart the Google Home Hub and the Amazon Echo Show 2 | Cracking Open", https://www.youtube.com/watch?v=9vo7PtXlzCk, Jan. 27, 2019, 1 page.

* cited by examiner

SPEAKER ASSEMBLY IN A DISPLAY ASSISTANT DEVICE

RELATED APPLICATIONS

This application claims priority and is a continuation-in-part of U.S. patent application Ser. No. 16/596,709, filed Oct. 8, 2019, titled "Display Assistant Device" and U.S. patent application Ser. No. 16/596,711, filed Oct. 8, 2019, titled "Drop Protection for Display Assistant Device." This application also claims priority to and is a continuation application of International Application No. PCT/US2018/064536, filed Dec. 7, 2018, titled "Speaker Assembly in a Display Assistant Device," which claims priority to the following applications, each of which is incorporated by reference in its entirety:

U.S. Provisional Patent Application No. 62/742,892, filed Oct. 8, 2018, titled "Display Assistant Device";

U.S. Provisional Patent Application No. 62/742,888, filed Oct. 8, 2018, titled "Drop Protection for Display Assistant Device";

U.S. Provisional Patent Application No. 62/743,464, filed Oct. 9, 2018, titled "Speaker Assembly in a Display Assistant Device."

This application is related to the following applications, each of which is incorporated by reference in its entirety:

International Application No. PCT/US2018/064449, filed Dec. 7, 2018, titled "Display Assistant Device"; which claims priority from U.S. Design application Ser. No. 29/663,725, filed Sep. 18, 2018, and U.S. Design application Ser. No. 29/663,723, filed Sep. 18, 2018;

International Application No. PCT/US2018/064452, filed Dec. 7, 2018, titled "Drop Protection for Display Assistant Device";

U.S. patent application Ser. No. 16/525,360, filed Jul. 29, 2019, titled "Display Assistant Device," which claims priority to and is a continuation application of International Application No. PCT/US19/28601, filed Apr. 23, 2019, titled "Display Assistant Device"; and International Application No. PCT/US19/28959, filed Apr. 24, 2019, titled "Multipurpose Speaker Enclosure in a Display Assistant Device," which is herein incorporated by reference in its entirety.

TECHNICAL FIELD

This application relates generally to electronic devices, including but not limited to methods and systems for guiding sound from a speaker that is at least partially obscured by a display screen.

BACKGROUND

Electronic devices integrated with microphones have been widely used to collect voice inputs from users and implement different voice-activated functions according to the voice inputs. These electronic devices, when made at a low cost and with relatively simple structures, are disposed at different locations in a smart home environment, so that they can be used as user interface devices to listen to the ambient environment and follow a user constantly without disturbing regular activities of the user. The electronic devices disposed at different locations in a smart home environment could be subject to restricted footprints, especially in areas such as a cluttered kitchen countertop or bedroom nightstand. As such, it would be beneficial to pack a number of mechanical and electronic parts into a small package in order to accommodate a smaller footprint. This, however, can potentially cause unintended consequences such as muffled sound due to the speaker being obscured underneath other components, such as a display screen. Further, it would be beneficial in designing a smaller footprint for the overall design to be substantially vertical. However, the more vertical the design, the greater the potential for falling over during physical user interactions due to a higher center of mass. It would be beneficial to incorporate one or more space saving designs that do not negatively affect sound quality, and further allow for a vertically oriented device to maintain a lower center of mass.

SUMMARY

An electronic device is applied in a smart home environment to provide an eyes-free and hands-free voice interface that can activate voice-activated functions for media devices or smart home devices in the smart home environment. The electronic device is configured to sit at a fixed location in the smart home environment, and at least includes a display screen in addition to a microphone and a speaker. The electronic device does not include a complicated operating system, but provides a low cost user interface solution dedicated to constantly listening to its surroundings, collecting audio inputs, and presenting both audio and video information in response to the audio inputs. Further, in some implementations, the audio inputs are collected from the surroundings to initiate voice-activated functions on other media play devices or smart home devices coupled within the smart home environment.

In one aspect, a display assistant device includes a speaker mounted in a waveguide structure which is at least partially disposed beneath a display screen. The waveguide structure is mounted in an exterior housing which includes speaker grills distributed on a plurality of surfaces of the exterior housing, permitting sound waves from the speaker to be projected outside the exterior housing. A cover structure is disposed on top of the waveguide structure to conceal the waveguide structure and speaker within the exterior housing. The cover structure has a tilted bottom surface configured to be suspended above the waveguide structure and to be separated by a first space. Sound waves projected from an upper portion of the speaker are reflected by the tilted bottom surface and are guided through the first space to exit the device from a speaker grill portion located on a rear side of the exterior housing.

In accordance with various embodiments of this application, the display assistant device has a substantially small footprint that allows the display assistant device to be conveniently disposed at many different locations (e.g., a kitchen, living room and bedroom) in the smart home environment. Despite the substantially small footprint, the speaker has a relatively heavy weight and is configured to pull a center of mass of the display assistant device close to the surface on which the display assistant device sits. A low center of mass allows the display assistant device to maintain stability at time of being touched or hit. In addition, the display assistant device further includes many mechanical features configured to protect the screen of the display assistant from falling apart from the base and being damaged when the display assistant device hits a floor. By these means, this application provides a low-cost, mechanically robust, and voice-activated user interface solution that has visual display capabilities and supports various voice-activated functions.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

While digital revolution has provided many benefits ranging from openly sharing information to a sense of global community, emerging new technology often induces confusion, skepticism and fear among consumers, preventing consumers from benefitting from the technology. Electronic devices are conveniently used as voice interfaces to receive voice inputs from users and initiate voice-activated functions, and thereby offer eyes-free and hands-free solutions to approach both existing and emerging technology. Specifically, the voice inputs received at an electronic device can carry instructions and information even if a user's line of sight is obscured and his hands are full. To enable hands-free and eyes-free experience, the voice-activated electronic device listens to the ambient (i.e., processes audio signals collected from the ambient) constantly or only when triggered. On the other hand, user identities are linked with a user's voice and a language used by the user. To protect the user identities, voice-activated electronic devices are normally used in non-public places that are protected, controlled and intimate spaces (e.g., home and car).

In accordance with some implementations of the invention, a voice-activated electronic device includes a screen configured to provide additional visual information in addition to audio information that can be broadcast via a speaker of the voice-activated electronic device. The voice-activated electronic device, when integrated with its own display screen, constitutes a display assistant device. The display assistant device thereby includes a base and a speaker in addition to the screen. The base is configured for sitting on a surface. The screen has a rear surface and is supported by the base at the rear surface. A bottom edge of the screen is configured to be held above the surface by a predefined height, and the base is substantially hidden behind the screen from a front view of the display assistant device (i.e., the base appears to float in air from the front view). The speaker is concealed inside the base and configured to project sound substantially towards the front view of the display assistant device. The display assistant device has a substantially small footprint, and however, a center of mass of the display assistant device is configured to be close to a surface on which the display assistant device sits, thereby allowing the display assistant device to maintain stability at time of being touched or hit. The display assistant device further includes a plurality of mechanical features configured to protect the screen from falling apart from the base and being damaged when the display assistant device hits a floor. That said, the display assistant device provides a low-cost, mechanically robust, and voice-activated user interface solution that has visual display capabilities and supports various voice-activated functions.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Figure 1:
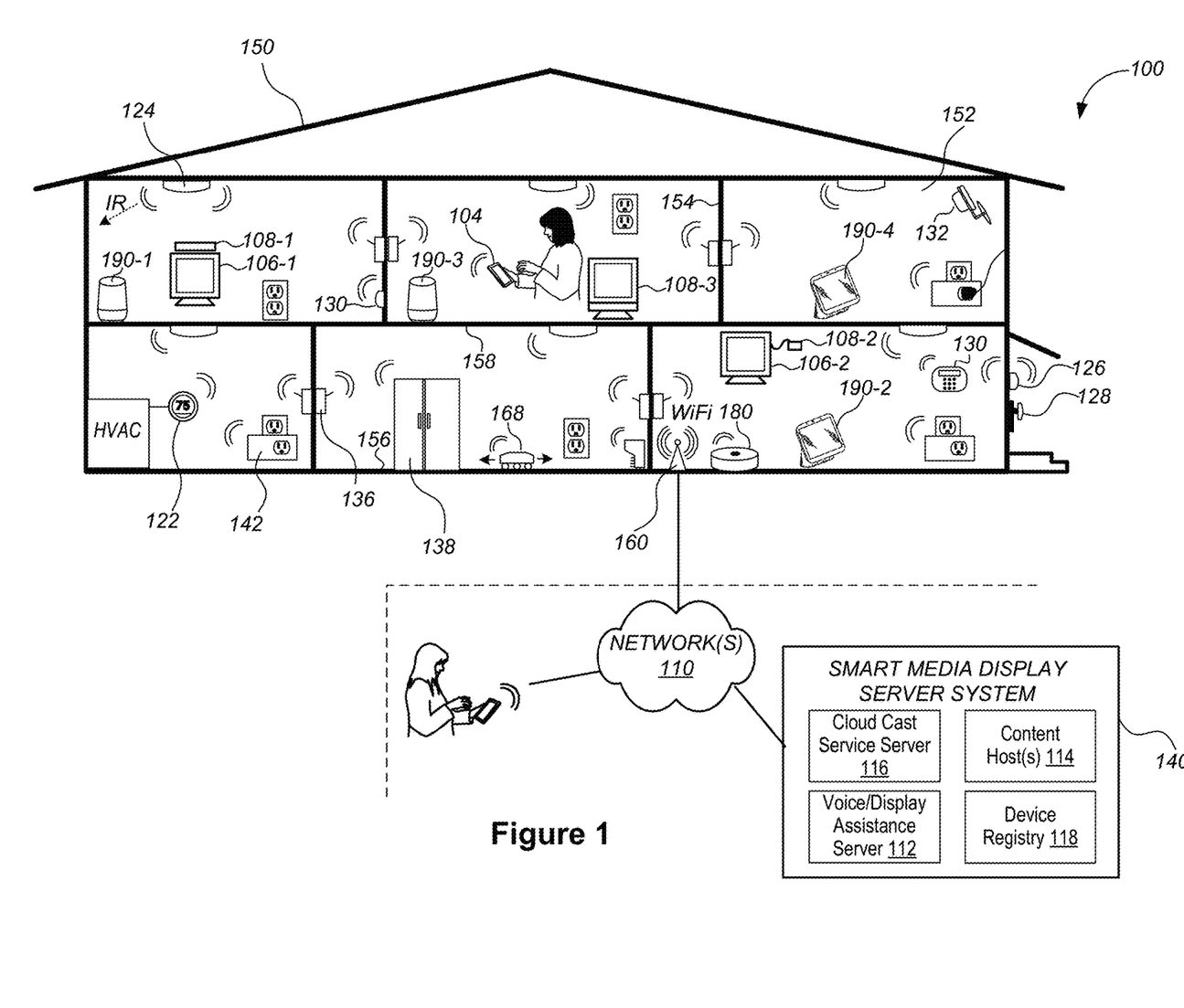
FIG. 1 is an example smart home environment in accordance with some implementations.

FIG. 1 is an example smart home environment 100 in accordance with some implementations. The smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. The depicted structure 150 includes a plurality of rooms 152, separated at least partly from each other via walls 154. The walls 154 may include interior walls or exterior walls. Each room may further include a floor 156 and a ceiling 158.

One or more media devices are disposed in the smart home environment 100 to provide media content that is stored at a local content source or streamed from a remote content source (e.g., content host(s) 114). The media devices can be classified to two categories: media output devices 106 that directly output the media content to audience, and cast devices 108 that are networked to stream media content to the media output devices 106. Examples of the media output devices 106 include, but are not limited to television (TV) display devices and music players. Examples of the cast devices 108 include, but are not limited to, set-top boxes (STBs), DVD players and TV boxes. In the example smart home environment 100, the media output devices 106 are disposed in more than one location, and each media output device 106 is coupled to a respective cast device 108 or includes an embedded casting unit. The media output device 106-1 includes a TV display that is hard wired to a DVD player or a set top box 108-1. The media output device 106-2 includes a smart TV device that integrates an embedded casting unit to stream media content for display to its audience. The media output device 106-3 includes a regular TV display that is coupled to a TV box 108-3 (e.g., Google TV or Apple TV products), and such a TV box 108-3 streams media content received from a media content host server 114 and provides an access to the Internet for displaying Internet-based content on the media output device 106-3.

In addition to the media devices 106 and 108, one or more electronic devices 190 are disposed in the smart home environment 100 to collect audio inputs for initiating various media play functions of the media devices. In some implementations, these voice-activated electronic devices 190 (e.g., devices 1901-1, 190-2 and 190-3) are disposed in proximity to a media device, for example, in the same room with the cast devices 108 and the media output devices 106. Alternatively, in some implementations, a voice-activated electronic device 190-4 is disposed in a room having one or more smart home devices but not any media device. Alternatively, in some implementations, a voice-activated electronic device 190 is disposed in a location having no networked electronic device.

The electronic device 190 includes at least one or more microphones, a speaker, a processor and memory storing at least one program for execution by the processor. The speaker is configured to allow the electronic device 190 to deliver voice messages to a location where the electronic device 190 is located in the smart home environment 100, thereby broadcasting music, reporting a state of audio input processing, having a conversation with or giving instructions to a user of the electronic device 190. As an alternative to the voice messages, visual signals could also be used to provide feedback to the user of the electronic device 190 concerning the state of audio input processing. When the electronic device 190 is a conventional mobile device (e.g., a mobile phone or a tablet computer) or has its own display screen, its display screen is configured to display a notification concerning the state of audio input processing.

In accordance with some implementations, the electronic device 190 is a voice interface device that is network-connected to provide voice recognition functions with the aid of a cloud cast service server 116 and/or a voice/display assistance server 112. For example, the electronic device 190 includes a smart speaker that provides music to a user and allows eyes-free and hands-free access to voice assistant service (e.g., Google Assistant). Optionally, the electronic device 190 is one of a desktop or laptop computer, a tablet and a mobile phone that includes a microphone. Optionally, the electronic device 190 is a simple and low cost voice interface device, e.g., a speaker device and a display assistant device (including a display screen having no touch detection capability).

In some implementations, the voice-activated electronic devices 190 includes a display assistant device (e.g., 190-2 and 190-4) that incorporates a display screen in addition to the microphones, speaker, processor and memory. The display screen is configured to provide visual information in addition to audio information that can be broadcast via the speaker of the voice-activated electronic device 190. When a user is nearby and his or her line of sight is not obscured, the user may review the visual information directly on the display screen of the display assistant device. Optionally, the visual information provides feedback to the user of the electronic device 190 concerning the state of audio input processing. Optionally, the visual information is provided in response to the user's previous voice inputs, and may be related to the audio information broadcast by the speaker. In some implementations, the display screen of the voice-activated electronic devices 190 includes a touch display screen configured to detect touch inputs on its surface. Alternatively, in some implementations, the display screen of the voice-activated electronic devices 190 is not a touch display screen, which is relatively expensive and can compromise the goal of offering the display assistant device 190 as a low cost user interface solution.

When voice inputs from the electronic device 190 are used to control the media output devices 106 via the cast devices 108, the electronic device 190 effectively enables a new level of control of cast-enabled media devices independently of whether the electronic device 190 has its own display. In a specific example, the electronic device 190 includes a casual enjoyment speaker with far-field voice access and functions as a voice interface device for Google Assistant. The electronic device 190 could be disposed in any room in the smart home environment 100. When multiple electronic devices 190 are distributed in multiple rooms, they become audio receivers that are synchronized to provide voice inputs from all these rooms.

Specifically, in some implementations, the electronic device 190 includes a WiFi speaker with a microphone that is connected to a voice-activated personal assistant service (e.g., Google Assistant). A user could issue a media play request via the microphone of electronic device 190, and ask the personal assistant service to play media content on the electronic device 190 itself or on another connected media output device 106. For example, the user could issue a media play request by saying to the WiFi speaker "OK Google, Play cat videos on my Living room TV." The personal assistant service then fulfils the media play request by playing the requested media content on the requested device using a default or designated media application.

A user could also make a voice request via the microphone of the electronic device 190 concerning the media content that has already been played on a display device. In some implementations, closed captions of the currently displayed media content are initiated or deactivated on the display device by voice when there is no remote control or a second screen device is available to the user. Thus, the user can turn on the closed captions on a display device via an eyes-free and hands-free voice-activated electronic device 190 without involving any other device having a physical user interface, and such a voice-activated electronic device 190 satisfies federal accessibility requirements for users having hearing disability. In some implementations, a user may want to take a current media session with them as they move through the house. This requires the personal assistant service to transfer the current media session from a first cast device to a second cast device that is not directly connected to the first cast device or has no knowledge of the existence of the first cast device. Subsequent to the media content transfer, a second output device 106 coupled to the second cast device 108 continues to play the media content previously a first output device 106 coupled to the first cast device 108 from the exact point within a music track or a video clip where play of the media content was forgone on the first output device 106.

In some implementations, in addition to the media devices (e.g., the output devices 106 and the cast devices 108) and the voice-activated electronic devices 190, smart home devices could also be mounted on, integrated with and/or supported by a wall 154, floor 156 or ceiling 158 of the smart home environment 100 (which is also broadly called as a smart home environment in view of the existence of the smart home devices). The integrated smart home devices include intelligent, multi-sensing, network-connected devices that integrate seamlessly with each other in a smart home network and/or with a central server or a cloud-computing system to provide a variety of useful smart home functions. In some implementations, a smart home device is disposed at the same location of the smart home environment 100 as a cast device 108 and/or an output device 106, and therefore, is located in proximity to or with a known distance with respect to the cast device 108 and the output device 106.

The smart home devices in the smart home environment 100 may include, but are not limited to, one or more intelligent, multi-sensing, network-connected thermostats 122, one or more intelligent, network-connected, multi-sensing hazard detectors 124, one or more intelligent, multi-sensing, network-connected entryway interface devices 126 and 128 (hereinafter referred to as "smart doorbells 126" and "smart door locks 128"), one or more intelligent, multi-sensing, network-connected alarm systems 130, one or more intelligent, multi-sensing, network-connected camera systems 132, and one or more intelligent, multi-sensing, network-connected wall switches 136. In some implementations, the smart home devices in the smart home environment 100 of FIG. 1 includes a plurality of intelligent, multi-sensing, network-connected appliances 138 (hereinafter referred to as "smart appliances 138"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth.

The smart home devices in the smart home environment 100 may additionally or alternatively include one or more other occupancy sensors (e.g., touch screens, IR sensors, ambient light sensors and motion detectors). In some implementations, the smart home devices in the smart home environment 100 include radio-frequency identification (RFID) readers (e.g., in each room 152 or a portion thereof) that determine occupancy based on RFID tags located on or embedded in occupants. For example, RFID readers may be integrated into the smart hazard detectors 104.

In some implementations, in addition to containing sensing capabilities, devices 122, 124, 126, 128, 130, 132, 136 and 138 (which are collectively referred to as "the smart home devices" or "the smart home devices 120") are capable of data communications and information sharing with other smart home devices, a central server or cloud-computing system, and/or other devices (e.g., the client device 104, the cast devices 108 and the voice-activated electronic devices 190) that are network-connected. Similarly, each of the cast devices 108 and the voice-activated electronic devices 190 is also capable of data communications and information sharing with other cast devices 108, voice-activated electronic devices 190, smart home devices, a central server or cloud-computing system 140, and/or other devices (e.g., the client device 104) that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the cast devices 108, the electronic devices 190 and the smart home devices 120 serve as wireless or wired repeaters. In some implementations, a first one of and the cast devices 108 communicates with a second one of the cast devices 108 and the smart home devices 120 via a wireless router. The cast devices 108, the electronic devices 190 and the smart home devices 120 may further communicate with each other via a connection (e.g., network interface 160) to a network, such as the Internet 110. Through the Internet 110, the cast devices 108, the electronic devices 190 and the smart home devices 120 may communicate with a smart server system 140 (also called a central server system and/or a cloud-computing system herein). Optionally, the smart server system 140 may be associated with a manufacturer, support entity, or service provider associated with the cast devices 108 and the media content displayed to the user.

Accordingly, the smart server system 140 may include a voice/display assistance server 112 that processes audio inputs collected by voice-activated electronic devices 190, one or more content hosts 104 that provide the displayed media content, a cloud cast service server 116 creating a virtual user domain based on distributed device terminals, and a device registry 118 that keeps a record of the distributed device terminals in the virtual user environment. Examples of the distributed device terminals include, but are not limited to the voice-activated electronic devices 190, cast devices 108, media output devices 106 and smart home devices 122-138. In some implementations, these distributed device terminals are linked to a user account (e.g., a Google user account) in the virtual user domain.

In some implementations, the network interface 160 includes a conventional network device (e.g., a router). The smart home environment 100 of FIG. 1 further includes a hub device 180 that is communicatively coupled to the network(s) 110 directly or via the network interface 160. The hub device 180 is further communicatively coupled to one or more of the above intelligent, multi-sensing, network-connected devices (e.g., the cast devices 108, the electronic devices 190, the smart home devices and the client device 104). Each of these network-connected devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled network-connected devices, configure the hub device to interoperate with devices newly introduced to the home network, commission new devices, and adjust or view settings of connected devices, etc.

When the voice-activated electronic devices 190 are used as user interface devices applied in a user's daily life, they are placed at different locations in the smart home environment 100, and merge into the smart home environment 100. The locations where the voice-activated electronic devices 190 are placed could be drastically different, so the electronic devices 190 are configured to have small footprints that can fit into different locations. An electronic device 190, when placed at different locations, faces different situations of blunt forces that may hit the electronic device 190 and push it off to the ground. Therefore, the center of mass, an orientation of the screen, an orientation and the base of the voice-activated electronic devices 190 are configured so that the voice-activated electronic devices 190 (particularly, a display assistant device) can sustain a blunt force up to a threshold level without being tipped over. Retention elements are also integrated to prevent edges of a display panel from falling apart from edges of a back cover in the voice-activated electronic device 190.

Figure 2A:
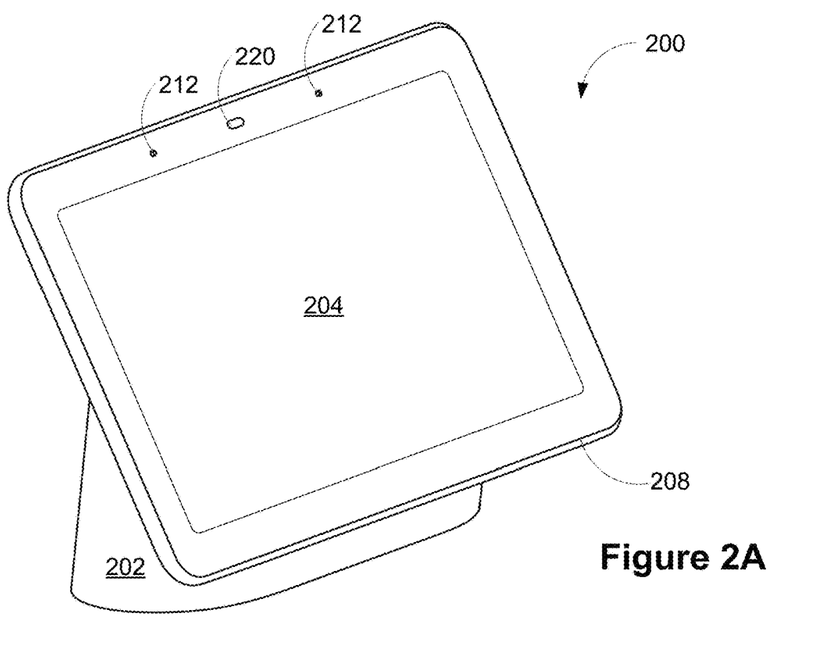
FIGS. 2A and 2B are a perspective view and a side view of a display assistant device (an example of the voice-activated electronic device having a display screen) in accordance with some implementations, respectively.
Figure 2B:
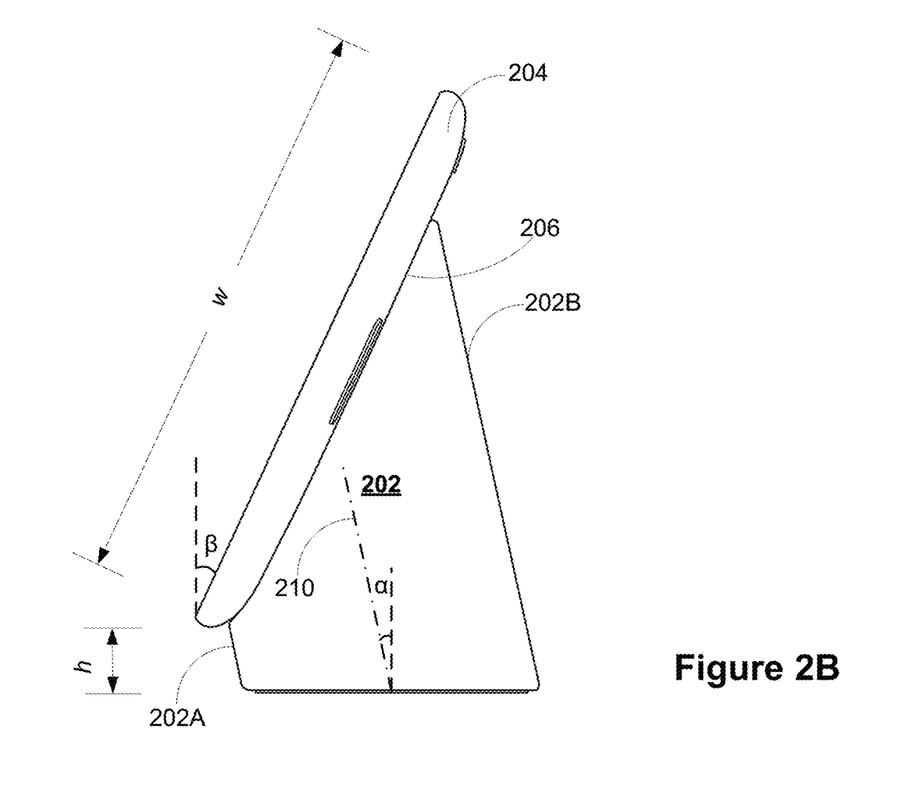

FIGS. 2A and 2B are a perspective view and a side view of a display assistant device 200 (an example of the voice-activated electronic device 190 having a display screen) in accordance with some implementations, respectively. The display assistant device 200 includes a base 202 and a screen 204. The base 202 is configured for sitting on a surface. The screen 204 has a rear surface 206 at which the screen 204 is supported by the base 202. A bottom edge 208 of the screen 204 is configured to be held above the surface by a predefined height h. The base 202 is substantially hidden behind the screen 204 from the front view of the display assistant device 200. That said, the predefined height h is less than a predetermined threshold (e.g., 15 mm), such that the screen 204 appears to float in air and the base 202 can be substantially hidden behind the screen 204 from the front view of the display assistant device 200. In an example, the predetermined threshold is 10% of a width w of the screen 204. If the screen 204 is a seven-inch screen having a width of 5 inches, the bottom edge 208 of the screen 204 is held above the surface by a height of 0.5 inches (12.7 mm) or below.

Referring to FIG. 2B, in some implementations, the base 202 extends along a central axis 210, and the central axis 210 of the base 202 is not perpendicular to the surface when the base 202 sits on the surface. Optionally, the base 202 has a front surface 202A and a rear surface 202B, at least one of which is parallel with the central axis 210. The central axis 210, front surface 202A and rear surface 202B of the base 202 lean forward by a base angle α when the base sits on the surface. It is noted that the front surface 202A of the base is shorter than the rear surface 202B of the base, e.g., a height of the front surface 202A is only 20% of that of the rear surface 202. When the screen 204 is supported by the base 202 at its rear surface 206, the screen 204 is not perpendicular to the surface, but faces substantially forward and leans slightly backward by a screen angle β for the purposes of providing a desirable viewing angle for an average user. In an example, both the base angle α and the screen angle β are equal to 15 degrees, except that the base leans forward by the base angle α of 15 degrees and the screen leans backward by the screen angle β of 15 degrees. By these means, the display assistant device 200 does not easily tip over (forward or backward) when a blunt force F hits a top edge of the display assistant device 200 or a user interaction (e.g., touch input) occurs to the screen 202 of the display assistant device 200.

The base 202 acts as a speaker box. A speaker is concealed inside the base and configured to project sound substantially towards the front view of the display assistant device, i.e., through a space of the predefined height h separating the bottom edge 208 of the screen 204 and the surface on which the display assistant device 200 is configured to sit.

The display assistant device 200 has a substantially narrow bezel area surrounding an active display area of the screen 204. In some implementations, the bezel area includes one or more microphone holes 212. One or more microphones are placed behind the microphone holes 212 and configured to collect sound from the environment of the display assistant device 200. In some implements, the display assistant device 200 further includes a sensor opening 220 configured to access an ambient light sensor and/or an RGB color sensor. The ambient light sensor or RGB color sensor is configured to detect a light condition in the smart home environment 100 where the display assistant device 200 sits. In some implementations, the display assistant device 200 is configure to adjust a brightness level of its screen 204 according to the light condition. The ambient light sensor and the RGB color sensor are disposed behind the bezel area and exposed to light via transparent part of the bezel area, e.g., the sensor opening 220.

A bottom surface of the base 202 constitutes a footprint of the display assistant device 202. A length of the bottom surface of the base 202 is smaller than (e.g., 75% or less of) a length of the screen 204, and a width of the bottom surface of the base 202 is significant smaller than (e.g., <40% or less of) a width w of the screen 204. As a result, the footprint of the display assistant device 202 is substantially small, and the display assistant device 202 can therefore fit into different physical settings (e.g., a kitchen, living room, and bedroom) in the smart home environment 100.

Figure 3:
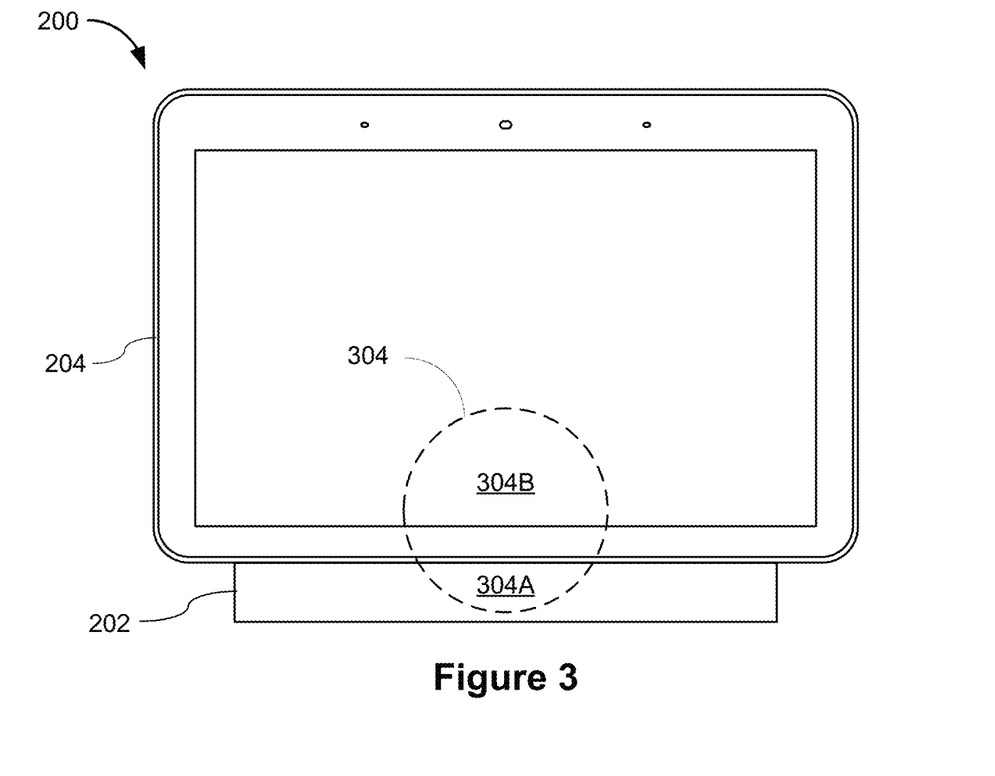
FIG. 3 is a front view of a display assistant device in accordance with some implementations.

FIG. 3 is a front view of a display assistant device 200 in accordance with some implementations. The display assistant device 200 includes a base 202 and a screen 204. The display assistant device also includes a speaker 304. The speaker 304 is mounted in a speaker assembly (which will be described in more detail below) located inside the display assistant device 200, such that a front portion of the speaker 304, sometimes referred to herein as a speaker opening, is disposed behind both (i) a front surface of the base 202, and (ii) the screen 204. The portion of the front of the speaker which is disposed behind the front surface of the base 202 is referred to herein as lower portion 304A, and the portion of the front of the speaker which is disposed behind the screen 204 is referred to herein as upper portion 304B. In some implementations, the size of the speaker 304 is desired to be as big as possible, compared to other components of the display assistant device 200. First, the bigger the speaker, the higher the potential sound quality. Second, the heavier the speaker, the lower center of mass will be, thus making the display assistant device 200 more stable. As the speaker 304 grows in size, however, more of the sound is blocked by the screen 204, due to the area of portion 304B growing larger compared to area 304A. While the front surface of base 202 is designed to facilitate projection of sound waves, through, e.g., a front-facing speaker grill (see FIG. 6, 621), the screen 204 cannot so easily accommodate the passage of sound waves since speaker grill cutouts would get in the way of valuable display real estate. Thus, various alternative channels for redirecting sound waves will be described below with respect to FIGS. 4-6.

In some implementations, the entire speaker 304, or substantially the entire speaker 204, is disposed behind the screen 204. In these implementations, portion 304A describes the area of the speaker 304 that produces sound waves that are directed toward openings in the front surface of the base 202, while portion 304B describes the area of the front of the speaker 304 that produces sound waves that are mostly directed toward the screen 204 and reflected back into the device 200 as a result.

Figure 4:
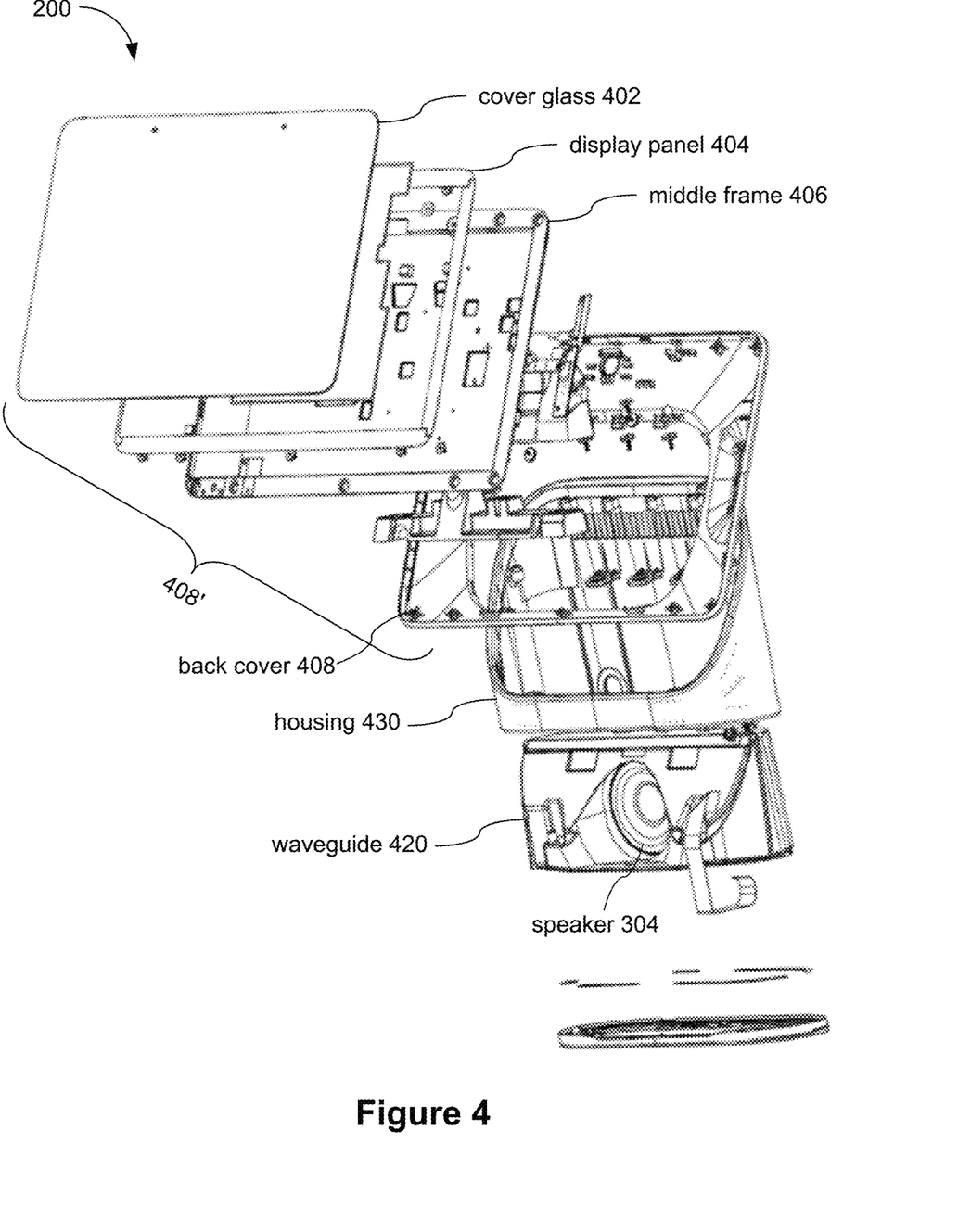
FIG. 4 is an exploded view of a display assistant device in accordance with some implementations.

FIG. 4 is an exploded view of a display assistant device 200 in accordance with some implementations. The screen 204 of the display assistant device 200 includes a cover glass 402, a display panel 404, a middle frame 406, and a back cover 408 in accordance with some implementations. In some implementations, the cover glass 402 and the display panel 404 are integrated in a display front, which is optionally obtained as an off-the-shelf module. In some implementations, the cover glass 402, the display panel 404, and the middle frame 406 are integrated in a display panel assembly that is further assembled with the back cover 408 to form the screen 204. In some implementations, when the display panel assembly 412 is assembled with the back cover 408, an edge of the back cover 408 rises above a corresponding edge of the display panel assembly so that when the screen 204 hits the ground, the edge of the back cover 408 can protect the edge of the display panel assembly (specifically, an edge of the cover glass 402) from hitting the ground and being shattering. Further, in some situations, the edge of the back cover 408 not only rises above, but also slightly wraps around the edge of the display panel assembly. In some implementations, the edge of the back cover 408 rises above a corresponding edge of the display panel assembly by a substantially small height (e.g., <0.5 mm) that is unnoticeable to a user.

The display panel 404 is configured to display graphics content. Optionally, the display panel 404 is substantially flat. Optionally, the display pane 404 is curved, and covered by a curved cover glass layer 402. In some implementations, a display panel assembly does not have a cover glass 402 covering the curved display panel 404; rather, the display panel 404 includes a protective layer on its top surface.

Edge areas of a rear surface of the cover glass 402 are covered with paint to define a bezel area surrounding an active display area of the screen 204. In some implementations, the bezel area includes one or more microphone holes 212. One or more microphones are placed behind the microphone holes 212 and configured to collect sound from the ambient of the display assistant device 200. Optionally, the cover glass 402 is coupled to the display panel 404 using an adhesive. The display panel 404 has a rear surface made of thermally and/or electrically conductive material (e.g., a metal plate). When a thermal spreader is attached to a portion of the rear surface of the display panel 404, the thermal spreader redistributes heat evenly across itself and the portion of the rear surface of the display panel 404, thereby avoiding formation of hot spots on the display panel 404.

The middle frame 406 is disposed between the display front (i.e., a combination of the cover glass 402 and the display panel 404) and the back cover 408. The middle frame 406 is mechanically coupled to the display front using an adhesive that is applied adjacent to edges of the display front and middle frame 406. Further, the middle frame 406 is mechanically coupled to the back cover 408 using an adhesive or mechanical structures.

Figure 5A:
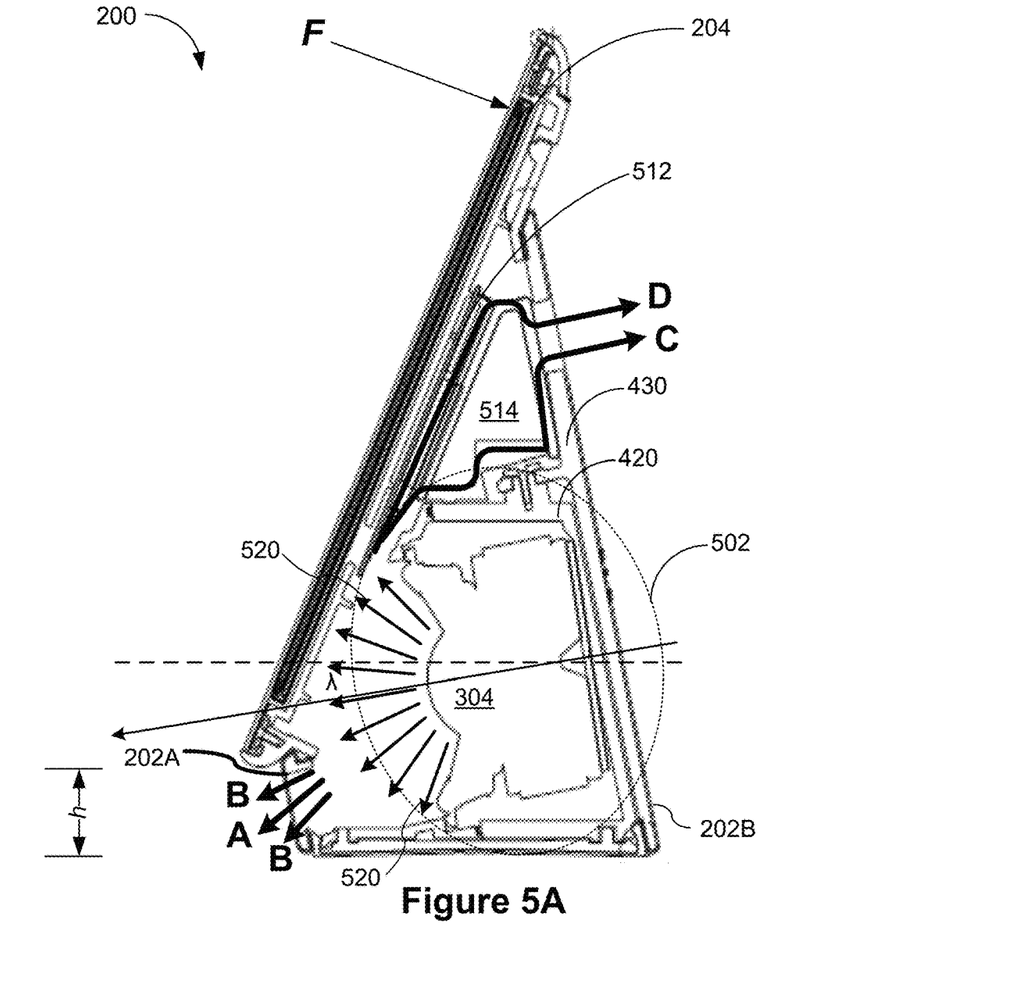
FIGS. 5A and 5B are a side view of a display assistant device with an assembled waveguide structure and a detailed view the waveguide structure, respectively, in accordance with some implementations.

In some implementations, the display assistant device 200 further includes a main logic board 512 mounted on a rear surface of the middle frame 406 (see FIG. 5A). The main logic board 512 includes a plurality of electronic components that generate heat. A heat sink 514 (or a protrusion structure including a heat sink) is attached to the main logic board 512 to absorb the heat generated thereon. Optionally, the heat sink 514 is solid. Optionally, the heat sink 514 is hollow and contains an insert. The main logic board 512 and the heat sink 514 are attached to the rear surface of the middle frame 406, which is further assembled with the display front and the back cover 408. The back cover 408 includes a first opening at a central portion of the screen 204. When the back cover 408 is assembled onto the screen 204, the main logic board 512 and the heat sink 514 attached to the middle frame 406 are aligned with the first opening of the back cover 408 and protrude out of the first opening.

During an example assembly process, the display front, the middle frame 406 and the base 202 are provided separately. A speaker assembly 502 is disposed in the housing 430, which is further covered by a base mount plate to form the base 202. The back cover 408 is assembled to the base 202, optionally by fastening top and bottom edges of the first opening of the back cover 408 to an interior rear surface and a front surface of the housing 430, respectively. After the back cover 408 is assembled to the base 202, the middle frame 406 is coupled to the back cover 408 via a plurality of first retention elements on the rear surface of the middle frame 406 and a plurality of second retention elements on a front surface of the back cover 408. The display front is coupled to the middle frame 406 via an adhesive either before or after the middle frame 406 is coupled to the back cover 408 and the base 202.

In some implementations, the base 202 of the display assistant device 200 includes an external housing 430, a waveguide/speaker mount structure 420, and a speaker 304. These components, as well as their physical relationships with the various components of the display 204 described above, are described in more detail with reference to FIGS. 5-6 below.

Figure 5B:
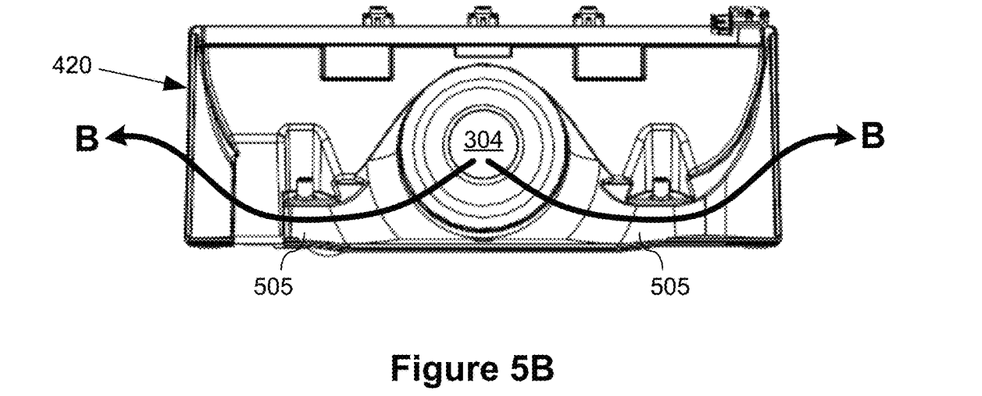

FIG. 5A is a cross sectional view of a display assistant device 200 in accordance with some implementations. The display assistant device 200 includes a speaker assembly 502, and the speaker assembly 502 further includes a speaker 304 mounted within a speaker waveguide 420. FIG. 5B is a front perspective of the speaker waveguide 420 in accordance with some implementations. The following discussion refers to common items in both FIGS. 5A and 5B.

The speaker 304 is concealed inside the base 202 and has a speaker opening disposed at a front portion of the speaker. The speaker opening has a dimension substantially greater than a predefined height h of the space separating a bottom edge of the screen 204 and a surface on which the display assistant device 200 is configured to sit. The speaker opening faces forward (in FIG. 5A, forward is towards the left; in FIG. 5B, forward is away from the page toward the reader of this application). In some implementations, the speaker opening is tilted downward with a tilting angle A.

Figure 6A:
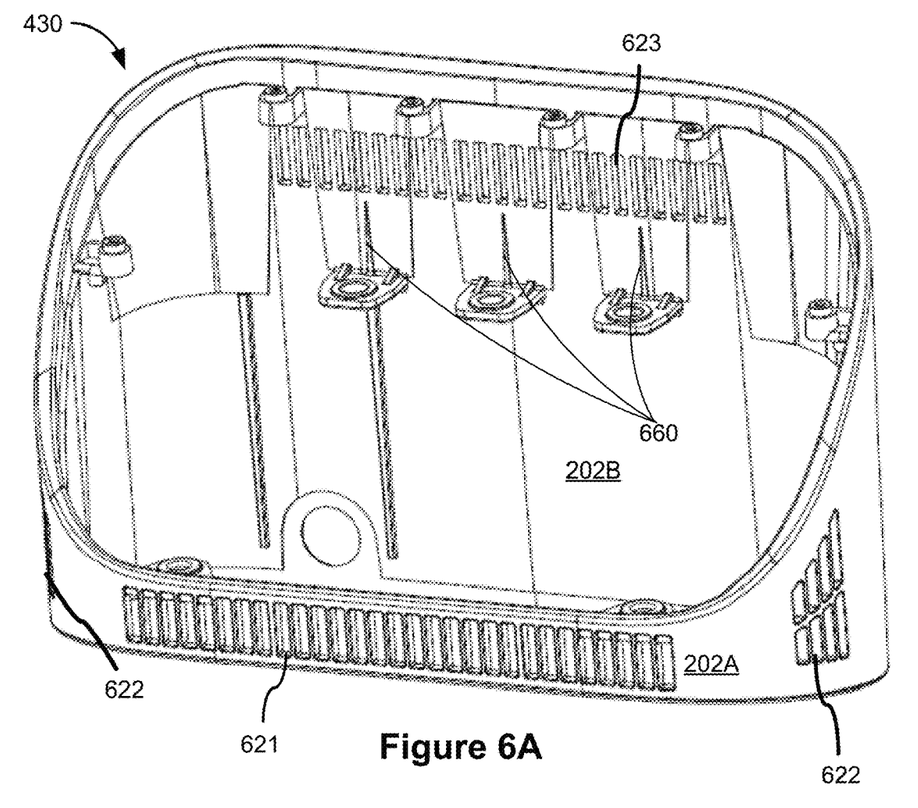
FIGS. 6A and 6B are perspective views of an external housing and a waveguide structure, respectively, in accordance with some implementations.

The speaker 304 is configured to project sound waves 520 substantially towards a front view of the display assistant device 200, i.e., project a substantial portion (e.g., in some implementations, 80% or more) of sound generated by the speaker 304 towards the space between the bottom edge of the screen 204 and the surface on which the base 202 sits. A housing 430 of the base 202 includes a plurality of speaker grill portions disposed on one or more of (i) a front surface 202A (see FIG. 6A, 621), (ii) a rear surface 202B (see FIG. 6A, 623), and (iii) a left side and/or a right side of the base 202 (see FIG. 6A, 622). In some implementations, a substantial portion of the sound generated by the speaker 304 (e.g., sound component A in FIG. 3) exits the base 202 via speaker grill portions on the front surface 202A of the base 202 (FIG. 6A, 621). Remaining portions of the sound generated by the speaker 304 (e.g., sound components B, C, and D) are guided inside the housing 430 to exit the base 202 via a subset of speaker grill portions that are disposed on one or more of the rear surface 202B (FIG. 6A, 623), and the left and/or right sides of the base 202 (FIG. 6A, 622). Portions of the sound generated by the speaker 304 that are guided inside the housing 430 to exit the base via the left and/or right sides of the base 202 (e.g., sound components B), are directed through waveguides 505 (sometimes referred to herein as "shoulders") on each side of the speaker 304. In some implementations, the waveguides 505 are integrated into the waveguide structure 420. In some implementations, the waveguide structure is formed from a single piece of material (e.g., an integrated unit molded from a moldable material with desirable acoustic and physical properties (e.g., density, heat transmissivity, acoustic resonance/damping, etc.) or 3D-printed from a 3D-printable material with similar properties). In some implementations, the waveguide structure 420 consists of separate structures that interact to provide the desired functionality. For example, in some implementations, the waveguides 505 can be separate components that are adjacent to the waveguide structure 420 that are configured to guide sound produced by the speaker 304 to one or more of the grills 622, 623 as described herein, and an inner portion of the base 430 can be configured to mate/seal to a back portion of the waveguide structure 420 to provide a sealed enclosure for the speaker 304.

The speaker assembly 502 is disposed in a lower portion of a base 202 to lower down a center of mass of the entire display assistant device 200. In some implementations, for the purpose of lowering down the center of mass, a speaker assembly having a larger weight is selected over a speaker assembly having a smaller weight when their costs or speaker box volumes are comparable. For example, a speaker has a volume of 120 cc, and a Neodymium based speaker is selected over a Ferrite based speaker because of its weight advantage. Given its center of mass, weight and angles (α and β), the display assistant device 200 does not tip over (forward or backward) easily when a blunt force F hits a top edge of the display assistant device 200 or a user touch occurs to the screen 204 of the display assistant device 200. For example, the center of weight is configured so that the display assistant device 200 can sustain an impact force of 50 Newton without tipping over. In some implementations, airflow associated with sound generated by the speaker 304 (e.g., sound that is guided along the sound propagation paths C and D shown in FIG. 5A) assists in heat dissipation by carrying to the outside of the device 200 heat absorbed by the heat sink 514 and/or heat generated by other electronic and/or display components of the device 200.

As explained above, the upper extent of the front surface 202A of the housing 430 is lower than the upper extent of the rear surface 202B of the housing 430, such that the housing 430 has a tilted opening configured to receive the screen 204. That said, the screen 204 and the base 202 are interconnected to form an interior space. In this interior space, a main logic board 512 is arranged in parallel with a display panel of the screen, and a heat sink 514 comes into contact with the main logic board 512 to absorb heat generated by the main logic board 512. The heat sink 514 is thereby disposed in the upper portion of the base 202. Optionally, the heat sink 514 at least partially sits on the speaker waveguide 420. Optionally, the heat sink 514 is mechanically attached to the main board 512 that is further included in the screen 204. The heat sink 514 is suspended above the speaker waveguide 420 and separated therefrom by a gap, and sound generated by the speaker 304 is partially guided towards the rear surface of the base 202 via the gap in accordance with a sound propagation path C.

Figure 6B:
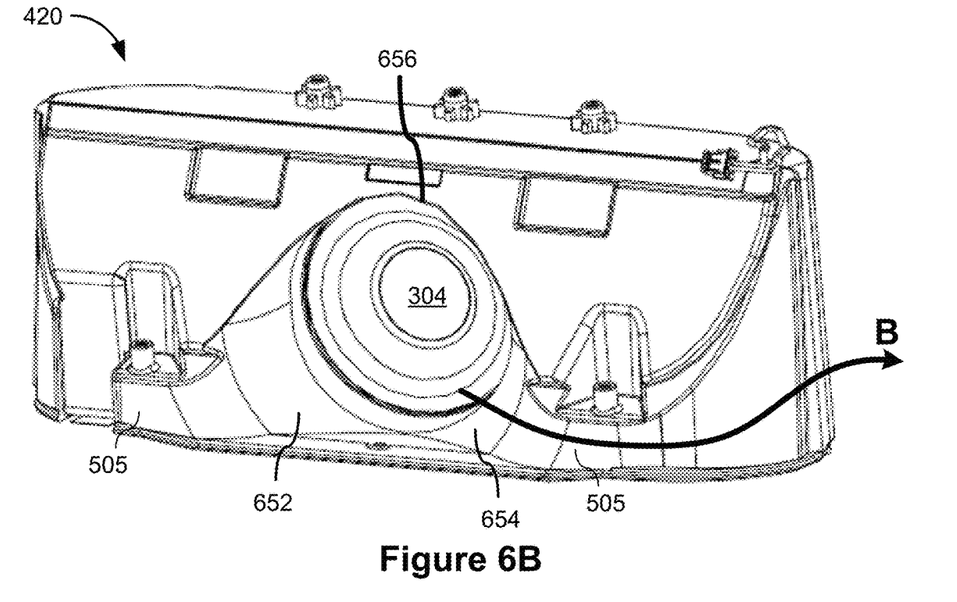
Figure 6C:
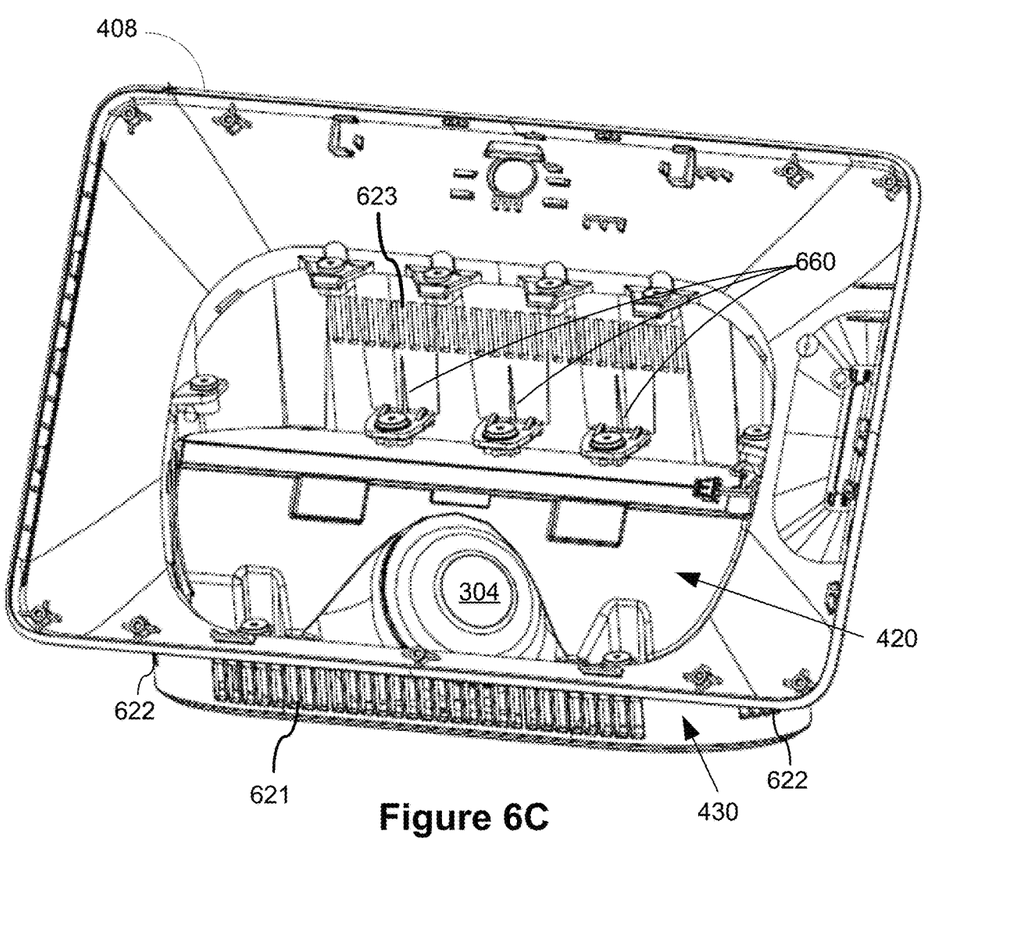
FIG. 6C is a perspective view of an assembled external housing, waveguide structure, and back cover in accordance with some implementations.

FIGS. 6A and 6B are more detailed perspective views of a housing 430 and a waveguide structure 420, respectively, and FIG. 6C is a perspective view of the waveguide structure 420 mounted inside of the housing 430 in an assembled state in accordance with some implementations.

Referring to FIG. 6A, the exterior housing 430 is asymmetric from a perspective view, having a front surface 202A with a height which is substantially lower than a height of a rear surface 202B. In some implementations, the rear surface 202B has a height that is at least three times that of the front surface 202A. In other implementations, the rear surface 202B has a height that is less than three times that of the front surface 202A, but is still taller than that of the front surface 202A.

Referring to FIGS. 6A and 6C, speaker grill portion 621 is disposed at the front surface of the housing 430, speaker grill portions 622 are disposed at the left and/or right sides of the housing 430, and speaker grill portion 623 is disposed at a rear surface of the housing 430. As assembled, the waveguide structure 420 is mounted inside of the housing 430 such that the waveguide channels 505 (see FIG. 6B) begin at the speaker 304 and terminate at the speaker grill portions 622, allowing sound waves to exit the sides of the display assistant device 200. In some implementations, the front speaker grill portion 621 is disposed along the front surface of the housing 430 enabling sound waves to exit the front of the display assistant device 200 while they are traveling through path(s) B toward the side speaker grill portion(s) 622.

Referring to FIG. 6B, the speaker 304 is mounted in the waveguide structure 420, such that the waveguide structure 420 exposes a front portion of the speaker 304 (alternatively referred to as a speaker opening of the speaker through which vibrations of a speaker membrane project sound waves) and provides a sealed enclosure for a rear portion of the speaker 304. In some implementations, the waveguide structure 420 includes two waveguides 505, sometimes referred to herein as shoulders, each of which is recessed and separated from the exterior housing 430 forming left and right shoulder spaces, such that sound waves projected from the front portion of the speaker 304 are (i) reflected by the tilted bottom surface of the cover structure (e.g., FIG. 4, items 406 and/or 408) and by portions of the front surface of the housing 430, and (ii) guided through the shoulder spaces to exit the display assistant device 200 from the side grill portions 622. In some implementations, the shoulder waveguides 505 form parabolic shapes with horizontal and/or vertical axes of symmetry (e.g., parallel or perpendicular, respectively, to the surface on which the display assistant device 200 sits). In some implementations, one waveguide 505 surface (e.g., 652) is parabolic with a first axis of symmetry, and an opposite waveguide 505 surface (e.g., 654) is parabolic with a second axis of symmetry perpendicular to the first. In some implementations, the first and second axes of symmetry are offset with respect to each other according to any degree that does not result in the axes being parallel to each other. In some implementations, a lower waveguide 505 surface (e.g., 652 and/or 654) adjacent to the speaker 304 is parabolic with a first axis of symmetry, and an upper waveguide 505 surface (e.g., 656) adjacent to the speaker 304 is parabolic with a second axis of symmetry perpendicular to the first, or offset compared to the first with any degree of offset that does not result in parallel axes of symmetry. Offsetting the axes of symmetry prevents standing waves from resonating in the various portions of the waveguides, thus preventing low quality audio characteristics that may occur as a result. On that note, some implementations of the waveguides 505 are similar to those described above; however, instead of the waveguide 505 surfaces being parabolic, the surfaces have any other shape that facilitates movement of sound waves from one point (e.g., the speaker 304) to another (e.g., one of the speaker grill portions 621, 622, or 623).

In some implementations, two shoulders 505 of the speaker waveguide 730 have different shapes, e.g., have a hyperbolic shape and a parabolic shape, respectively. In some implementations, spaces are created to eliminate air disturbance associated with the sound that exits the base 202 via a front side of the housing 430 and thereby reduce noise in the sound broadcasted from the speaker 304.

Figure 6D:
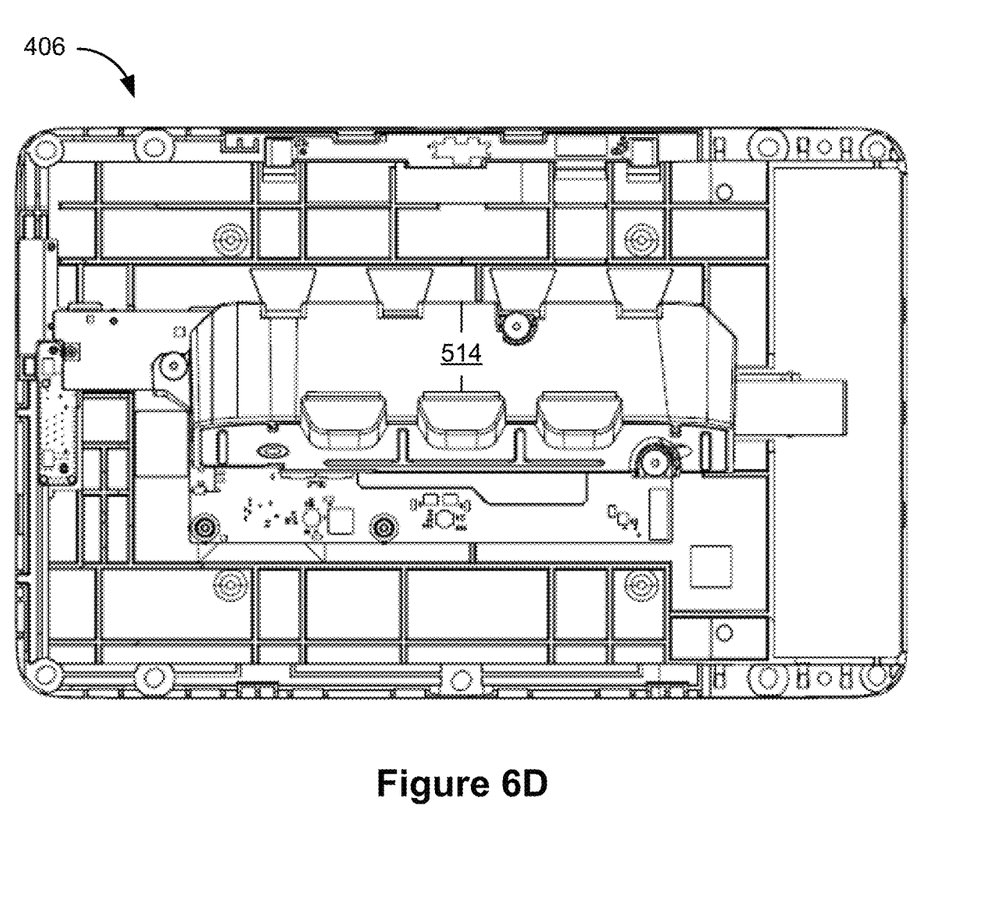
FIG. 6D is a back view of a middle frame and a heat sink in accordance with some implementations.
Figure 6E:
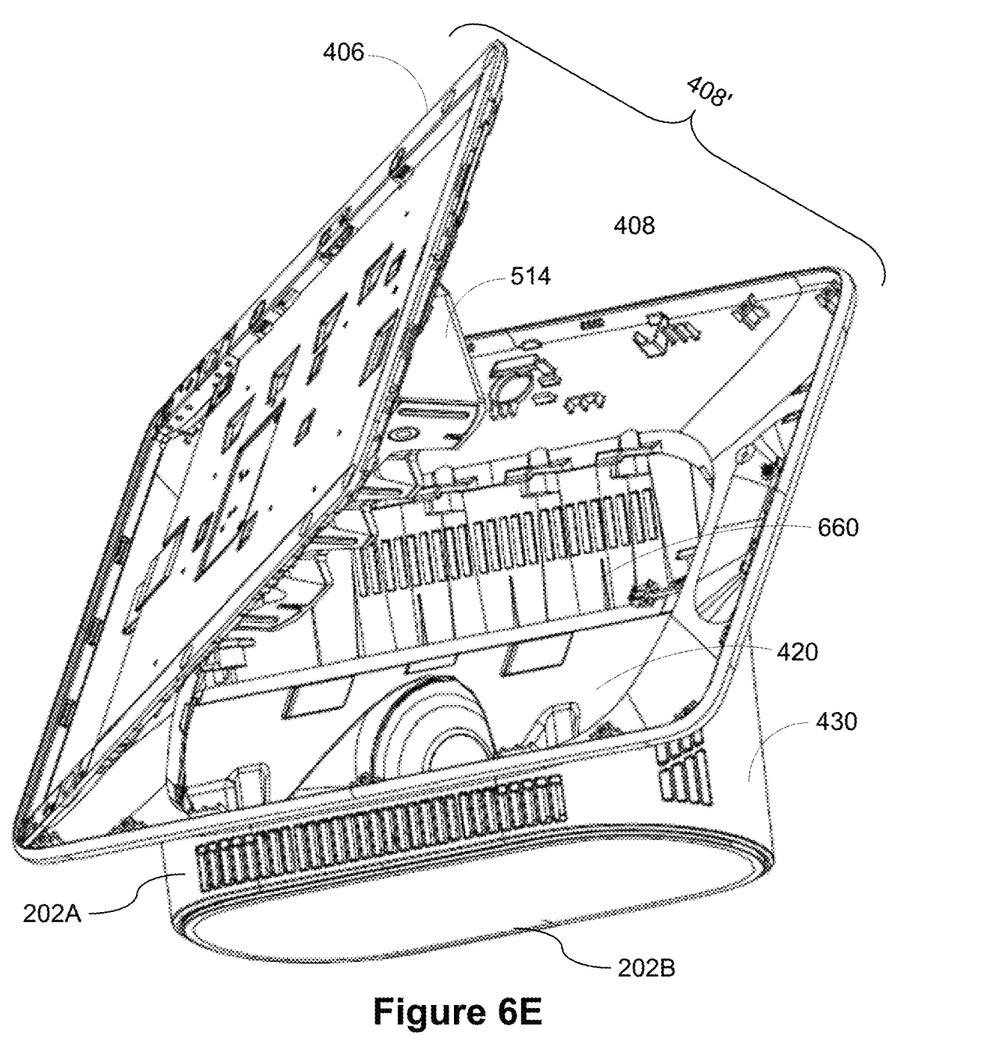
FIG. 6E is a perspective view of the middle frame partially assembled to the housing, waveguide, and back plate assembly of FIG. 6C in accordance with some implementations.

FIGS. 6C through 6E are perspective views of various states of assembly of a display assistant device 200 in accordance with some implementations. Referring to FIG. 6C, a back cover 408 is disposed on top of the waveguide structure 420, thereby concealing the waveguide structure and the speaker 304 within the exterior housing 430. Referring to FIGS. 6D and 6E, a frame 406 includes a heat sink 514 (described in more detail above and alternatively referred to herein as a protrusion structure), and is assembled onto the back cover 408. In some implementations, upon assembly of the frame 406 and cover 408 onto the housing 430 and waveguide 420 assembly (as depicted in FIG. 6E), the frame 406 or a combination of the frame 406 and cover 408 is alternatively referred to herein as a cover structure 408'. In some implementations, the cover structure 408' has a tilted bottom surface configured to be suspended above the waveguide structure 420.

Also, upon assembly of the cover structure 408' to the housing 430 and waveguide 420 assembly, two spaces separate the frame and the heat sink from the waveguide structure 420. These spaces are depicted as paths C and D in FIG. 5A. Sound waves projected from the speaker 304 (e.g., upper portion 304B) are reflected by the tilted bottom surface of the back cover 408 and/or frame 406 and are guided through path C (and in some implementations, through path D) to exit the display assistance device 200 from the back speaker grill portion 623. In some implementations, these spaces have respective depths that are smaller than respective heights. For example, one or both of paths C and D are disposed in spaces with a depth being less than 1 mm, less than 3 mm, less than 10 mm, or less than 25 mm.

In some implementations, the housing 430 includes a plurality of crush ribs 660 (FIGS. 6A, 6C and 6E) disposed on an interior surface underneath the rear speaker grill portion 623. The crush ribs are configured to guide sound waves projected through path C (FIG. 5A) toward the openings in the speaker grill portion 623. It is noted that when the heat sink 514 protrudes into the base 202, it is substantially close to an interior rear surface of the housing 430, e.g., a first gap between the heat sink 514 and the interior rear side of the housing 430 has a width of 2 mm or less. The plurality of crush ribs 660 extend along a direction of the sound propagation path C. The plurality of crush ribs 660 are configured to guide the sound projected from the upper portion of the speaker 304 through the first space to exit the speaker assembly 502 via the speaker grill portion 623. In some implementations, each of the plurality of crush ribs 660 tapers when it extends from a lower position on the interior rear surface of the housing 430 to the speaker grill portion 623. That said, when each crush rib 660 has a semicircular cross section, a radius of the cross section is configured to shrink gradually when the crush rib 660 extends to the speaker grill portion 623. In some implementations, when the heat sink 514 is disposed into the base 202, it comes into contact with and is pushed onto the plurality of crush ribs 660.

The frame 406, or alternatively the display panel 404 or any other mechanical component of the screen 204, includes a logic board 512 (described in more detail above). In some implementations, the heat sink 514 comes in contact, or is disposed in close proximity to, the logic board 512, thereby absorbing heat generated from the logic board. In some implementations, the heat sink is hollow. Alternatively, the heat sink is filled with a plastic insert. For example, the heat sink is metal and is filled with an insert. Optionally, the insert is made of plastic or silicone. The heat sink creates an acoustic effect in which acoustic harmonics (e.g., standing waves) are suppressed. Additionally, when sound waves are generated by the front portion of the speaker, the sound waves are guided through the space(s) surrounding the heat sink 514 (FIG. 5A, paths C and D), thereby dissipating heat from the heat sink and carrying it away through a flow of air via the path(s) C and/or D toward the rear speaker grill portion 613 (FIG. 6C).

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A speaker assembly, comprising:
   a speaker including a front portion and a rear portion;
   a waveguide structure in which the speaker is mounted,
   the waveguide structure exposing the front portion of
   the speaker and providing a sealed enclosure for the
   rear portion of the speaker;

an exterior housing in which the waveguide structure is mounted, wherein the exterior housing further includes a plurality of speaker grill portions distributed on a plurality of sides of the exterior housing, wherein the plurality of speaker grill portions permit sound waves from the front portion of the speaker to be projected outside the exterior housing; and a cover structure that is disposed on top of the waveguide structure to conceal the waveguide structure and speaker within the exterior housing, wherein the cover structure has a tilted bottom surface configured to be suspended above the waveguide structure and to be separated therefrom by a first space, wherein the cover structure includes a substantially flat display panel substantially parallel to the tilted bottom surface;

wherein the front portion of the speaker includes an upper portion and a lower portion, the upper portion facing the tilted bottom surface of the cover structure and the lower portion facing a front side of the exterior housing, such that (i) sound waves projected from the lower portion of the speaker exit the speaker assembly from a first speaker grill portion located on the front side of the exterior housing, and (ii) sound waves projected from the upper portion of the speaker are reflected by the tilted bottom surface of the cover structure and are guided through the first space to exit the speaker assembly from a second speaker grill portion located on a rear side of the exterior housing.

2. The speaker assembly of claim 1, wherein the waveguide structure includes two shoulders each of which is recessed and separated from the exterior housing by a respective second space, such that (iii) sound waves projected from the front portion of the speaker are reflected by the tilted bottom surface of the cover structure and the front side of the exterior housing and guided through the second spaces to exit the speaker assembly from two third speaker grill portions located on two peripheral ends of the exterior housing.

3. The speaker assembly of claim 1, wherein each of the first and second spaces have respective depth components and respective height components, wherein each respective depth component is smaller than each respective height component.

4. The speaker assembly of claim 1, wherein the cover structure includes a protrusion structure that protrudes into the exterior housing to provide at least part of the tilted bottom surface, and the first space is formed between the at least part of the tilted bottom space and a top surface of the waveguide structure.

5. The speaker assembly of claim 1, wherein the cover structure further includes a printed circuit board to which a protrusion structure is attached, and the protrusion structure includes a heatsink that is configured to absorb heat generated from the printed circuit board.

6. The speaker assembly of claim 5, wherein the heatsink is hollow, and filled with a plastic insert.

7. The speaker assembly of claim 5, wherein when sound waves generated by the front portion of the speaker are guided through the first space, heat absorbed by the heatsink from the printed circuit board is carried away by an air flow of the guided sound waves.

8. The speaker assembly of claim 1, wherein the cover structure further includes a cover plate to which a protrusion structure is attached, and the cover plate is separated from the cover structure by a third space, such that the sound projected from the upper portion of the speaker is configured to be guided through the third space in addition to the first space to exit the speaker assembly from the second speaker grill portion located on the rear side of the exterior housing.

9. The speaker assembly of claim 1, wherein the exterior housing is asymmetric, and the front side of the exterior housing is substantially lower than a rear side of the exterior housing.

10. The speaker assembly of claim 1, wherein the display panel leans backward from a vertical position by an angle of 15 degrees such that the display panel faces slightly upward.

11. The speaker assembly of claim 1, wherein the front portion of the speaker faces slightly downward by an angle of 15 degrees.

12. The speaker assembly of claim 1, wherein the exterior housing further includes a plurality of crush ribs formed on an interior surface of the exterior housing that is located underneath the second speaker grill portion, and the plurality of crush ribs are configured to guide the sound projected from the upper portion of the speaker through the first space to exit the speaker assembly via the second speaker grill portion.

* * * * *